United States Patent Office 3,186,226
Patented June 1, 1965

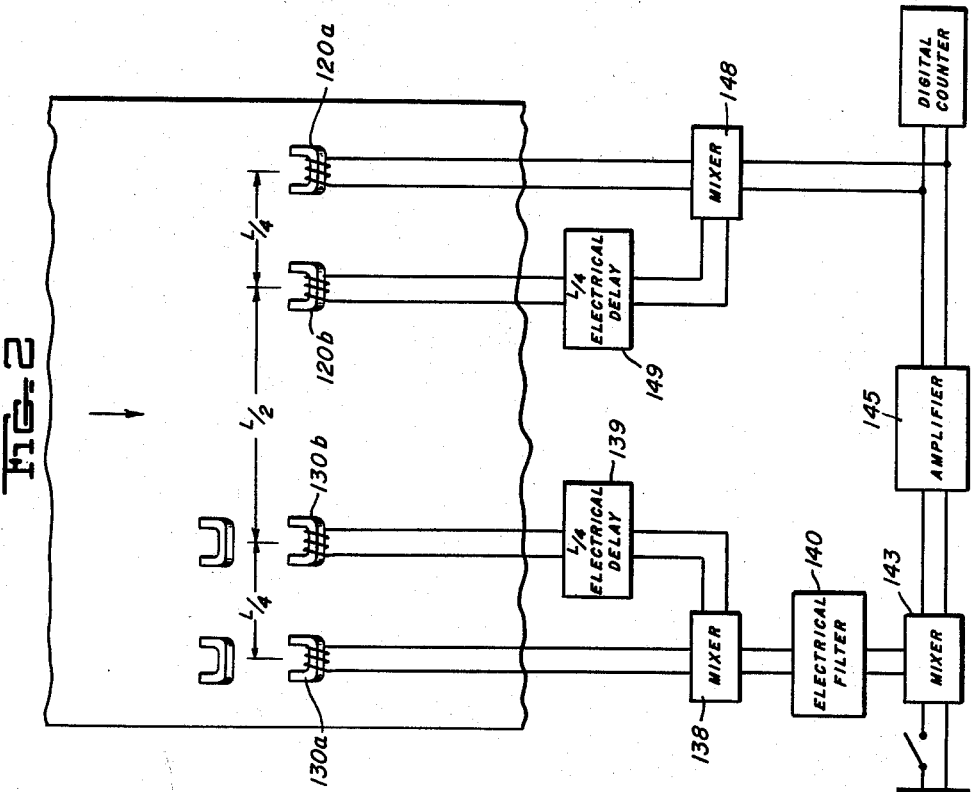
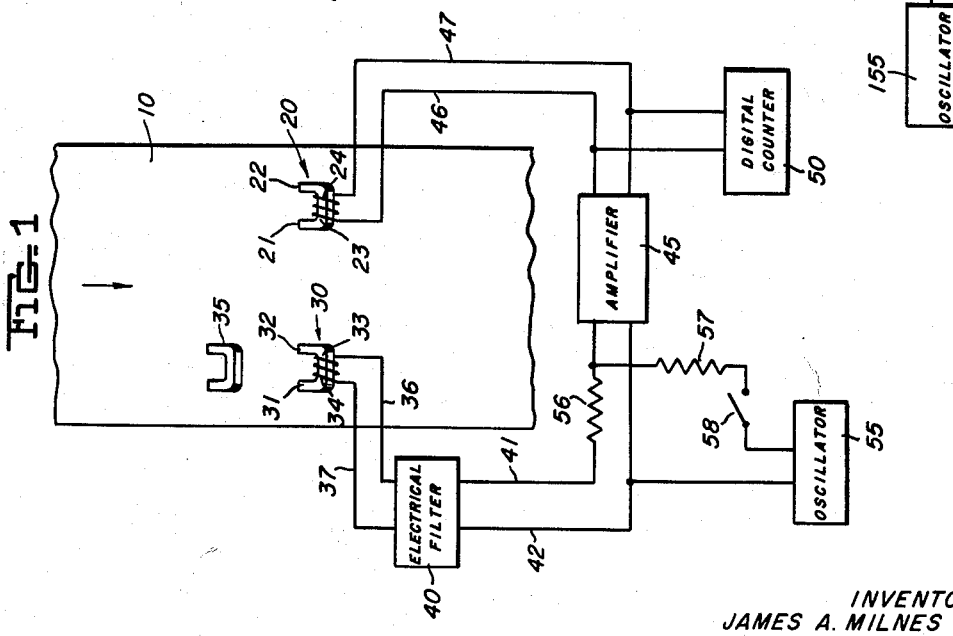
INVENTORS
JAMES A. MILNES and
WILLIAM L. ROBERTS
By Donald G. Dalton
Attorney

3,186,226
APPARATUS FOR DETERMINING THE TEMPERATURE OF TRAVELLING STRIP
James Anthony Milnes, Pitcairn, and William Leslie Roberts, Murrysville, Pa., assignors to United States Steel Corporation, a corporation of New Jersey
Filed June 26, 1961, Ser. No. 119,705
11 Claims. (Cl. 73—339)

This invention relates generally to the determination of temperature, or Young's Modulus, of solid material and more particularly, to the use of sound waves to determine the temperature, or Young's Modulus, of a moving steel strip without physical contact with the strip.

In many instances, for example, in the manufacture of tin plate, it is particularly desirable to have an accurate means for determining the temperature of the strip. In the manufacture of electrolytic tin plate the tin is reflowed after deposition. This requires bringing the coated strip rapidly to a temperature of 430° F., holding at this temperature for about four seconds, raising rapidly through the tin melting point and then quenching. It is important that the temperature of 430° F. be accurately established and maintained within rather narrow limits. Conventional means for measuring temperatures of this order of magnitude are not entirely satisfactory.

Radiation measuring instruments are inadequate in that they are relatively insensitive at temperatures from 400° F. to 500° F. and the indications produced by these instruments are affected by the emissivity of the strip, which is low and varies considerably with the method of preparation of the tin plate. Contacting-type, temperature-measuring devices also present disadvantages. Such devices mar the surface of the strip and are affected by ambient temperature and strip speed. Similarly, those that make only intermittent contact with the strip are even more inaccurate, since they are not in contact with the strip for a sufficient time at any one period to allow them to acquire the same temperature as the strip.

It is, therefore, a principal object of this invention to provide a noncontacting method for measuring the temperature of a solid material, which method is not affected by ambient temperature or emissivity of the material.

It is a further object of this invention to provide a device which utilizes sound waves to measure the temperature of a solid material.

Yet another object of this invention is to provide a method and device for inducing sound waves into a solid material and sensing the frequency of the induced sound waves.

A more particular object of this invention is to provide a method and device for determining the temperature of a travelling strip of steel by sound waves without physical contact with the strip.

Yet another more general object of this invention is to provide a method for determining Young's Modulus in a solid material.

Other objects and a fuller understanding may be had from the following description and claims taken in conjunction with the accompanying drawings, in which:

FIGURE 1 is a circuit diagram of the temperature measuring device; and

FIGURE 2 is another embodiment of the device of FIGURE 1.

The velocity of sound in a solid material is proportional to Young's Modulus of the material. The velocity $V_B$ of a compressional wave in a slender bar is given by the formula $$V_B = \sqrt{\frac{Y}{d}}$$

where $Y$ is Young's Modulus of the material and $d$ is its density. The velocity $V_P$ of compressional waves in thin plates is given by the formula $$V_P = \sqrt{\frac{Y}{d} \cdot \frac{1}{1-g^2}}$$

where $g$ is Poisson's Ratio.

Hence, it may be seen that the velocity of a compressional wave propagated lengthwise across a thin plate is directly proportional to the square root of Young's Modulus of the material, if the density and Poisson's ratio are assumed to remain constant.

It is well known that Young's Modulus is affected by temperature, as may be seen from the curves illustrating this effect, "The Making, Shaping and Treating of Steel," 6th ed., page 922. Over the temperature range of 200° to 600° F., Young's Modulus changes in value from $29 \times 10^6$ p.s.i. to $26.5 \times 10^6$ p.s.i. in a fairly linear manner. Thus, at about 400° F., a one degree change in temperature would cause a percentage change in Young's Modulus of $$\frac{2.5}{27.75} \times \frac{100}{400}\% \text{ or } 0.0229\%$$

In this temperature range the density of the steel and Poisson's ratio are not significantly affected by the temperature change. Thus, it can be seen that, for a one degree change in temperature, the velocity of sound changes by $$\frac{0.0229}{2}\%$$

or approximately 0.01%. Hence, to measure temperature change to an accuracy of one degree F., it is necessary to measure the change of the velocity of sound with an accuracy of approximately 1 part in 10,000. Changes of the velocity of sound may be measured with an accuracy of at least 1 part in 100,000. The device of this application is designed to induce sound waves into a strip and measure their frequency. When Young's Modulus is known, the temperature can be determined and when the temperature is known, Young's Modulus can be determined.

Referring now to the drawings and particularly FIGURE 1, a portion of a steel strip is shown and designated by the reference character 10. The strip is travelling in the direction indicated by the arrow. A transmitting transducer 20 is located adjacent, but spaced from the strip 10. The transducer 20 has a pair of pole pieces 21, 22 and a central core 23. A coil 24 surrounds the central core 23. The method of energizing the transmitting transducer will be described presently. When the transducer 20 is energized by alternating current, a cyclical magnetic ux is induced between the pole pieces 21, 22. The cyclical flux between the pole pieces 21, 22 results in a magnetostrictive effect which causes corresponding cyclical expansion and contraction of the steel. This cyclical expansion and contraction of the steel propagates compressional sound waves across the widths of the strip.

A pickup transducer 30 spaced from the strip 10 is provided across the strip from the transmitting transducer 20. The pickup transducer 30 includes a pair of pole pieces 31, 32, a central core 33 and a coil 34 around the central core 33. A permanent magnet 35 is located adjacent the pickup transducer 30 on the strip approach side thereof and is positioned to saturate the area of the strip passing beneath the pickup head 30 with magnetic flux. The compressional waves induced by the transmitter 20 and propagated across the strip 10 are sensed by the pickup transducer 30 producing oscillating currents in the coil 34. The E.M.F. developed by the coil 34 is fed by conductors 36, 37 to an electrical filter 40, the purpose of which will be described presently. From the filter the current is fed through conductors 41, 42 to an amplifier 45. The amplifier 45 amplifies the current to maintain the signals at a given amplitude. Conventional AVC feedback circuits are employed in the amplifier to control the amplitude of the signal in a manner that prevents saturation of the amplifier. Such amplifiers with AVC feedback circuits are well known. Compressor amplifier 436A, manufactured by the Altec Housing Corporation of 1515 S. Manchester Avenue, Anaheim, California, is an example of such an amplifier. The signal is delivered from the amplifier 45 to conductors 46, 47 which are connected to the coil 24. Thus, the transmitter 20, pickup head 30 and the amplifier 45 constitute a closed loop-feedback system. Without AVC feedback circuits in the amplifier, the gain in the loop would be in excess of unity and the system would be regenerative and oscillatory. However, the AVC system in the amplifier maintains the loop gain at unity, insuring that the signal levels at the various parts of the loop remain constant.

The frequency of the oscillation in the system depends on the spacing between the transmitting transducer 20 and the pickup transducer 30, the phasing of the signal into the coil 24, and other delays in the electrical circuit. If the signal that is induced to the transmitting transducer 20 is in phase with the signal received by the pickup transducer 30, the frequency of the natural oscillation of the system will be such that the spacing between the transmitter 20 and the pickup head 30 represents an integral number of wave lengths of the sound waves in the strip. Thus, if the distance between the transducer is two feet, since the velocity of sound in a strip of steel is in the order of magnitude of 15,000 feet per second, the basic oscillatory frequency of the system would be approximately 7,500 c.p.s. It should be noted that these values are given as approximations since the exact speed and hence frequency varies with Young's Modulus. It is the exact frequency which is measured, and from which, temperature is determined. If the system is operated at this basic frequency, the filter 40 is a low-pass filter having a cut-off frequency of about 8 kc./s. Without the low-pass filter, the system is operable on harmonics of this basic frequency, where the spacing between the transmitter 20 and the pickup head 30 is an integral number of wave lengths. If it is desired to operate a system at one of these harmonics, then the filter 40 is an appropriate band-pass filter. For example, if the second harmonic is used, the filter should have a pass band of approximately 14 to 16 kc./s.

If the phasing of the input signal to the amplifier is reversed, then the natural oscillatory frequency will be such that the spacing between the transmitter 20 and the pickup head 30 would be approximately equal to a half wave length or an odd number of half wave lengths. The lowest frequency under these conditions would be about 3,750 c.p.s. The next harmonic would correspond to a wave length of 1½ in the steel or a frequency of 11,250 c.p.s. Similarly, the next harmonic would be at a frequency of about 18,750 c.p.s.

The frequency of oscillation in the feedback loop is measured by a digital counter 50 If desired, a computer can be used to replace the counter 50, which computer converts the frequency of oscillation to a direct temperature reading.

Reviewing the system as thus far described, the transmitting transducer 20 applies an oscillating flux to the strip 10, which propagates compressional sound waves across the strip 10. The compressional waves are sensed by the pickup transducer 30 and converted to an oscillating E.M.F. in the coil 34. The oscillating E.M.F. is amplified and applied to the transmitting transducer 20 to provide the oscillating flux in the strip 10 Thus, a closed loop system is provided in which the oscillation frequency is dependent upon the speed in which the waves travel across the steel strip. Because the speed of the travel of the propagated oscillation across the steel strip 10 is dependent upon Young's Modulus, which in turn is dependent upon the temperature of the steel strip, the frequency of oscillation will be dependent upon the temperature of the steel strip. If the temperature in the steel strip changes, the oscillation frequency will change. The counter 50 measures the oscillation frequency. A chart can be prepared from the equations given above and graphs similar to those referred to above to convert frequency to temperature.

To initiate the system, an oscillator 55 is provided to induce a signal into the amplifier 45. Resistors 56, 57 are provided to match the output of the oscillator to the impedance of the input circuit of the amplifier 45. A switch 58 is provided to selectively connect the oscillator to the system. To initiate the system, the switch 58 is closed and an oscillatory signal of about 15,000 c.p.s. is introduced to the amplifier and applied to the transmitting transducer 20. The connection of the oscillator 55 in the system provides the initiating power for the system and is disconnected after the signal has been introduced to the system. When the oscillator has been disconnected from the circuit, the signals in the circuit will stabilize at a frequency dependent upon the temperature of the strip. Once initiated, the loop is self sustaining.

FIGURE 2 illustrates another embodiment of this device which minimizes the effect of wave reflections that may propagate from the edges of the strip. To achieve this result, directionally sensitive transducers are used. These transducers will react to the sound waves in much the same manner as Yagi antennas respond to radio signals. In the embodiment of FIGURE 2, a pair of transmitting transducers 120a, 120b are provided. The transducers 120a, 120b are separated by a distance equivalent to one-quarter wave length. A pair of pickup transducers 130a and 130b are provided and spaced apart one-quarter of a wave length. Transducers 120b and 130b are separated by a distance equal to one-half wave length or an odd number of one-half wave lengths. Transducer 130a is directly connected to a mixer 138 and transducer 130b is connected to an electrical delay unit 139 which is connected to mixer 138. A typical delay unit is described in the book "Wave Forms" by Chance et al. on pages 751–764, and typical mixers are described in the book "Analogue Methods" by Karplus and Soroka on pages 21–25. The delay time of the delay unit 139 corresponds to a quarter of the period of the basic oscillation of the system ($L/4$). The delay unit 139 is a magnetostrictive delay line, a liquid delay column, or any other suitable delay circuit. It should be noted that delay unit 139 has a fixed time delay, and thus as changes in the temperature of the strip cause the frequency of the system to vary, this unit is no longer exactly $L/4$ delay unit. However, since the temperatures to be measured are within a limited range, the deviation of the delay from a one-quarter period will not significantly affect the operation of the system. The mixer 138 takes two separate input signals and delivers a single output signal. The output signal from the mixer 138 is delivered through a filter 140 to a second mixer 143. This mixer takes the output signal from the filter 140 and also from an oscillator 155, when connected, and delivers a single signal to an amplifier 145. The amplifier 145 is similar to the amplifier of the embodiment of FIGURE 1. From the amplifier the signal is delivered to a third mixer 148. Mixer 148 receives a single signal and divides it into two parts. One part of the signal is delivered directly to transducer 120a, and the other to transducer 120b through a second delay unit 149. The delay unit 149 has a delay time corresponding to one-quarter of the period of basic oscillation of the system. As pointed out above, the oscillation will change with a change in the temperature of the strip, but this change will not significantly change the operation of the delay unit.

Operation of the system as shown in FIGURE 2 is basically the same as that of the embodiment of FIGURE 1. A signal from the amplifier 145 is fed through the mixer 148 directly to the transducer 120a and through the mixer 148 via the delay unit 149 to the transducer 120b. Acoustical waves generated in the strip by the transducer 120a arrive at transducer 120b in phase with the acoustical waves developed by 120b. Accordingly, the signals reinforce each other, and a sound wave propagates from right to left across the strip, as shown in the FIGURE 2. However, signals produced by transducer 120b arrive at transducer 120a 180° out of phase with the signal produced by transducer 120a. Accordingly, the two signals tend to cancel each other, and little or no acoustical disturbance is propagated from transducer 120a to the right edge of the strip. Thus it may be seen that the transducers 120a and 120b cause the acoustical disturbances in the strip to propagate to transducers 130a and 130b with little or no energy flowing to the right edge of the strip. In a similar way, transducers 130a and 130b are predominantly sensitive to waves propagating from right to left and not to waves propagating from left to right. The reinforced signal from transducers 120a and 120b will reach the transducer 130a at the same time and in phase with the signal originally sensed by transducer 130b, which is delivered from the delay unit 139. Accordingly, at mixer 138 the two signals will be reinforced, passed through the filter 140 (either the low-pass or band-pass type) to the mixer 143, and finally to the amplifier 145. A signal reflected from the left edge of the strip will reach pickup transducer 130b one quarter of a period later than it reaches pick-up transducer 130a. Since the delay unit 139 causes a further delay in the signal produced at pickup transducer 130b, the signals from pickup transducers 130a and 130b, which are produced by a wave travelling left to right in the strip, will be 180° out of phase. Therefore, reflections from the left edge of the strip will not affect the operation of the system.

Frequently Young's Modulus at a given temperature will vary for different strips of steel. This variance is caused by a number of factors including chemical composition of the steel and prior operations that have been performed thereon. This variance often is substantial and hence, it is necessary to accurately establish the graph of Young's Modulus for each strip. However, the slope of the curve for the variations of Young's Modulus with temperature is substantially constant for steel irrespective of variations due to composition and working. Hence, the measurement of Young's Modulus at one temperature will establish the curve and Young's Modulus at any temperature for the given material can be determined. To measure Young's Modulus at a given temperature and establish the curve for the material, an identical device is utilized. The device is installed at a location where the temperature of the strip is accurately known. For example, the device can be installed at a point where the strip is just emerging from a bath of a known temperature. By measuring the oscillatory frequency produced at a known temperature, Young's Modulus at that temperature is calculated and the curve established. Thus Young's Modulus at any temperature is known, and the temperature, at any point can be determined as described above.

While several embodiments of our invention have been shown and described it will be apparent that other adaptations and modifications may be made without departing from the scope of the following claims.

We claim:

1. A device for measuring the temperature of a moving strip of steel, which device comprises in combination, an electromagnetic transmitting transducer positioned adjacent but spaced from one surface of said strip, said transducer being positioned to induce sound waves in said strip, a pickup transducer spaced from said transmitting transducer and from said steel strip and positioned to sense sound waves in said strip, magnet means adjacent to said pickup transducer and positioned to induce magnetic flux in said strip, electric circuit means interconnecting said transmitting transducer and said pickup transducer, said circuit means including means to amplify the sound waves sensed by the pickup transducer and transmit said amplified waves to said transmitting transducer, said circuit including initiating means selectably connectable to said transmitting transducer to initially actuate said transmitting transducer, said circuit including wave frequency measuring means.

2. The device of claim 1, wherein said circuit has electric filter means between said pickup transducer and said means to amplify and transmit the waves.

3. A device for measuring the temperature of a travelling strip of steel, said device comprising in combination, a transmitting transducer, said transducer having a pair of spaced pole pieces and a coil positioned to induce and vary magnetic flux between said pole pieces, said pole pieces being adjacent but spaced from said strip and positioned to induce varying flux into the strip to create sound waves in said strip, a pickup transducer, said pickup transducer having a pair of pole pieces and a coil, said pole pieces of said pickup transducer being adjacent said strip but spaced therefrom and spaced from said transmitting transducer, the pole pieces of said pickup transducer being positioned to sense sound waves in said strip and develop an electrical signal in the coil of the pickup transducer, a magnet adjacent but spaced from said strip and closely spaced from said pickup transducer positioned to magnetize that portion of the strip adjacent the pole pieces of the pickup transducer, said coil of said pickup transducer being connected to an electric filter, said filter being connected to wave amplifying means, said wave amplifying means being connected to the coil of said transmitting transducer, oscillator means selectably connectable to said transmitting transducer through said amplifying means to initially energize said transmitting transducer, and a frequency meter connected to said pickup transducer to measure the frequency of the sensed sound waves, whereby the frequency of the sound waves in the material is measured and the temperature determined.

4. A device for measuring the velocity of sound in a travelling strip of steel, which device comprises in combination, first and second sound wave inducing transducers, said sound wave inducing transducers being spaced from each other a distance approximately $L/4$, where L approximates the wave length of the induced sound waves, first and second pickup transducers, said pickup transducers being spaced from each other a distance approximately $L/4$, said sound wave inducing transducers, and said pickup transducers being on a straight line, the pickup transducer and sound inducing transducer that are closest together being spaced from each other a distance approximately $nL/2$ where $n$ is an odd number, electric circuit means connecting said sound inducing transducers and said pickup transducers, said circuit means including means to combine and means to amplify sound waves sensed by said pickup transducers, and means to apply the amplified waves to said inducing transducers approximately $L/4$ out of phase with each other, and means to initially energize said inducing transducers.

5. A device for measuring the velocity of sound in a traveling strip of steel, which device comprises in combination, first and second sound wave inducing transducers, said sound inducing transducers being spaced from each other a distance approximately $L/4$, where L approximates the wave length of the induced sound waves, first and second pickup transducers, said pickup transducers being spaced from each other a distance approximately $L/4$, said sound wave inducing transducers, and said pickup transducers being on a straight line, the pickup transducer and sound inducing transducer that are closest together being spaced from each other a distance approximately $L/2$, circuit means connecting said sound inducing transducers and said pickup transducer, a first mixer having a first input connection connected to the pickup transducer farthest from the inducing transducers, a first delay unit having a delay of approximately $L/4$ connected to said pickup transducer nearest said sound wave inducing transducers, said mixer having a second input connection connected to said first delay unit, said first mixer being adapted to receive signals from the pickup transducer and delay unit and deliver a single signal to an output connection, amplifier means including AVC feedback means connected to the output connection of said first mixer, a second mixer having an input connection and first and second output connections and adapted to deliver at least two signals from a single received signal, said amplifier being connected to the input connection of the second mixer, said first output connection of the second mixer being connected to a second delay unit having a delay of approximately $L/4$, said second delay unit being connected to the inducing transducer nearest the pickup transducers, the second output connection of said second mixer being connected to said inducing transducer farthest from the pickup transducers, and means to energize said inducing transducers.

6. In the device of claim 5, the provision of an electric filter between said first mixer and said amplifier.

7. In the device of claim 6 wherein a third mixer is connected to said filter and said energizing means and also connected to said amplifier means, said third mixer being adapted to receive signals from the filter and the energizing means and deliver a single signal to the amplifier.

8. A device for measuring the temperature of a material comprising in combination, a transmitting transducer positioned adjacent said material and adapted to induce sound waves in said material, a pick-up transducer spaced from said transmitting transducer and adapted to sense sound waves in said material, electric circuit means interconnecting said transmitting transducer and said pick-up transducer, said circuit means including means to amplify the sound waves sensed by said pick-up transducer and transmit the amplified wave to said transmitting transducer, initiating means selectably connectable to said transmitting transducer to initially actuate said transducer, and said circuit including the wave frequency measuring means.

9. The device of claim 8 wherein the material is a moving strip and at least one of the transducers is spaced from the material.

10. The device of claim 8 wherein the material is magnetic material and the transmitting transducer is an electromagnetic transducer.

11. The device of claim 10 wherein the material is a moving strip and each of the transducers is spaced from the material.

References Cited by the Examiner

UNITED STATES PATENTS

| 2,217,843 | 10/40 | Langer | 324—40 |
| 2,238,091 | 4/41 | Zuschlag | 324—40 |
| 2,934,756 | 4/60 | Kalmus | 73—339 X |
| 3,058,339 | 10/62 | Shapiro | 73—71.4 |

FOREIGN PATENTS

| 494,971 | 8/53 | Canada. |
| 598,176 | 2/48 | Great Britain. |
| 623,022 | 5/49 | Great Britain. |

OTHER REFERENCES

American Machinist, May 23, 1946, pp. 132–133 relied upon.

Froman: Physical Review, 2nd series vol. 35, 1930, pp. 264–268 relied upon.

Mack: Metals Technology, vol. 12, December 1945, Tech. Pub. 1936, pp. 4, 5, 11 relied upon.

Sears: University Physics, Second ed. (1955), p. 359 relied upon.

ISAAC LISANN, *Primary Examiner.*

UNITED STATES PATENT OFFICE
CERTIFICATE OF CORRECTION

Patent No. 3,186,226                          June 1, 1965

James Anthony Milnes et al.

It is hereby certified that error appears in the above numbered patent requiring correction and that the said Letters Patent should read as corrected below.

Column 2, line 54, for "ux" read -- flux --.

Signed and sealed this 19th day of October 1965.

(SEAL)
Attest:

ERNEST W. SWIDER                                EDWARD J. BRENNER
Attesting Officer                                 Commissioner of Patents